June 3, 1969 R. STOFFEL ET AL 3,447,313
SUPERCHARGED TWO-STROKE CYCLE INTERNAL COMBUSTION PISTON ENGINE
Filed Oct. 2, 1967 Sheet 1 of 3

Inventors:
Richard Stoffel
Gosen Joop Hellingman
BY
ATTORNEYS

United States Patent Office 3,447,313
Patented June 3, 1969

3,447,313
SUPERCHARGED TWO-STROKE CYCLE INTERNAL COMBUSTION PISTON ENGINE
Richard Stoffel, Winterthur, and Gosen Joop Hellingman, Wiesendangen, Switzerland, assignors to Sulzer Brothers Limited, Winterthur, Switzerland, a Swiss company
Filed Oct. 2, 1967, Ser. No. 672,247
Claims priority, application Switzerland, Oct. 11, 1966, 14,638/66
Int. Cl. F02b *41/10, 75/02;* F01k *23/14*
U.S. Cl. 60—13                                9 Claims

ABSTRACT OF THE DISCLOSURE

There is disclosed a two-stroke cycle internal combustion piston engine of one or more cylinders having an exhaust-driven supercharger and having moreover for each cylinder a separate air pump, formed by the underside of the piston in that cylinder. This pump draws air through a check valve from a reservoir common to all cylinders (fed by the supercharger) and pumps it through another check valve into a separate air chamber for its cylinder, from which air flows into the cylinder through scavenging ports. This pump produces in the air chamber a peak pressure between 1.1 and 1.3 times the absolute pressure in the reservoir. In addition a supplementary air blower is provided, for use when the engine is operated at less than full load, connected between the reservoir and a further air chamber common to all cylinders, this last-named chamber connecting via check valves with the air chambers individual to the cylinders.

Background of the invention

Internal combustion piston engines with free-running turbo superchargers are known to have difficulties in supplying themselves with enough combustion air when operating under partial load, both for such partial load operation itself and also for any increase in the load, for which the engine must of course at all times be prepared.

These difficulties are particularly serious in internal combustion piston engines in which the exhaust gases from all the cylinders go to a single exhaust reservoir having a relatively large volume, so that the pressure in this reservoir is substantially constant during operation, "dynamic" or "constant pressure" operation of the supercharging turbine taking place. Engines with supercharging of this type are highly efficient under medium and high loads, and at high supercharging pressures they are superior in efficiency and specific fuel consumption to engines having turbo supercharger units which recover energy from the kinetic energy of the exhaust gases. However, since in engines in which the supercharging turbine operates at constant pressure the kinetic energy of the exhaust gases expelled from the cylinders is not used, the pressure in the exhaust reservoir becomes low when the engine is operating below a certain partial load. The air pressure delivered by the supercharger blower is therefore also low, and the pressure drop in passing from the air reservoir of the supercharger through the cylinders to the exhaust reservoir is too small for good scavening of the cylinders and may even be negative.

It is well known that in such internal combustion piston engines with dynamic operation of the exhaust-driven turbines, piston pumps can be arranged in series with the supercharger blower, to supply an air reservoir common to all cylinders. If the undersides of the pistons in the engine cylinders are used as pumps for this purpose, as has been proposed to be done in crosshead engines, it has heretofore been the practice to provide at least one additional piston pump since, because of the relatively large dead space, piston undersides can only supply approximatetly 85% of the cubic capacity of their cylinders. However, the additional piston pump raises the cost of the engine and increases its overall dimensions, especially if it is operated by an additional crank on the engine crankshaft.

Summary of the invention

The object of the invention is to overcome this disadvantage and to provide a supercharged two-stroke cycle internal combustion piston engine, which, with a minimum of mechanical means, has the high efficiency of an internal combustion piston engine supercharged on the dynamic principle and also has enough combustion air available when operating under partial load to give good acceleration and to operate without forming smoke in any working range.

In order to hold down the capacity of the supplementary blower of the invention and to deliver only the additional quantity of air required for partial load operation (approximately 10 to 20% of the quantity supplied by the piston pump), the pressure provided by the supplementary blower may be lower than the pressure peak produced by the piston pumps in the air chambers. If the pressure at the outlet of the supplementary blower is less than that peak pressure, non-return flow means must be provided between the auxiliary blower and the individual air chambers to prevent any reverse flow.

The supplementary blower may be a centrifugal blower or fan operated by an electric motor independently of the engine speed and supplying air with a substantially constant compression ratio. This blower may operate according to the air pressure in the air reservoir and it may be switched off when the air pressure in the reservoir reaches a level high enough for satisfactory operation of the engine.

Brief description of the drawings

The invention will now be further described with reference to an exemplary embodiment as shown in the accompanying drawings, in which.

Description of preferred embodiment

Figure 1:
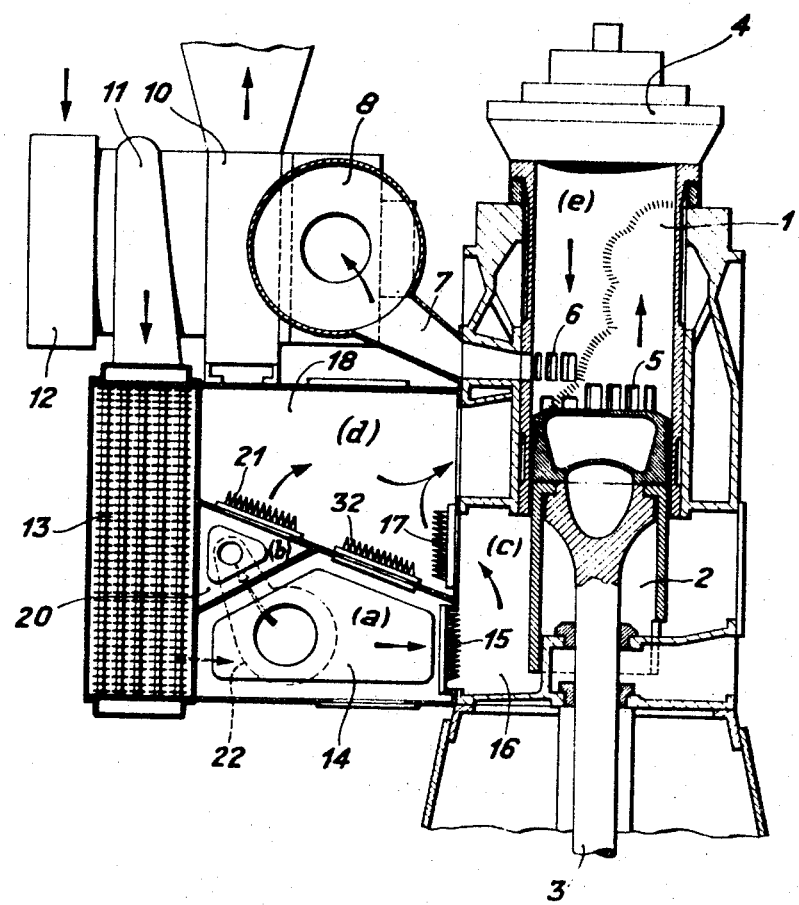
FIG. 1 is a section, in a plane perpendicular to the engine crankshaft, through the upper portion of a crosshead-type internal combustion piston engine embodying the invention, parts of the engine which are not essential to comprehension of the invention being omitted or simplified.

The engine shown in section in FIG. 1. includes a cylinder 1 in which moves a piston 2 with a piston rod 3 leading to a crosshead (not shown). Typically the engine will include plural such cylinders, the section of FIG. 1 being perpendicular to the length of the crankshaft (not shown) which is coupled by a connecting rod to the crosshead abovementioned. A cylinder head 4 closes the top of the cylinder 1. The cylinder also has scavenging ports 5 and exhaust ports 6. An exhaust duct 7 leads from the exhaust ports 6 of each cylinder to an exhaust reservoir 8, common to all the cylinders in the engine. The exhaust gases pass from the reservoir 8 to an exhaust-driven turbine 10. This turbine drives a supercharger blower 11 which draws air in through an air filter 12 and sends it through a cooling radiator 13 into an air reservoir 14 common to all cylinders. The air reservoir 14 is connected by non-return valves 15 to a pump chamber 16 for the cylinder 1 shown. The pump chamber is formed in this case—the engine being a crosshead engine—by the underside of the piston of the associated cylinder. Thus in the embodiment shown there is a separate pump for each engine cylinder, disposed (in the sense of air flow) between the common air reservoir 14 and that engine cylinder. The pump chamber 16 in turn communicates by way of non-return valves 17 with an air chamber 18. In the case of a multi-cylinder engine, there is a separate air chamber 18 for each cylinder. Each air chamber 18 (if the engine includes plural cylinders) is connected to the scavenging ports 5 of its cylinder 1 and thence into that cylinder, the flow of air through the ports into the cylinder being controlled in a known manner by the piston 2. The volume of each air chamber 18 and the volume of the associated pump chamber 16 are so selected relative to the displacement of the piston 2 moving in that chamber 16 that during the delivery stroke of the pump—in the embodiment shown when the piston 2 moves downwards —and shortly before the scavenging ports 5 are opened by the head of the piston, there occurs in the associated air chamber 18 and in the pump chamber 16 a pressure rise having a peak of 1.1 to 1.3 times the value of the absolute supercharge pressure in reservoir 14. The pump chamber 16 itself is made as small as possible to give good volumetric efficiency to the reciprocating pump, provided therein by motion of the piston 2, but adequate flow cross-sections must of course be provided for the air.

Parallel to the common air reservoir 14 there is an auxiliary air space 20, also common to all cylinders of the engine. It is connected by way of non-return valves 21 to the individual air chambers 18 and by way of a supplementary blower 22 to the reservoir 14. The blower 22 pumps air from the reservoir 14 into the air space 20, producing in the space 20 a slight excess of pressure over that in the reservoir 14. As the arrows in FIG. 1 indicate, the non-return valves 15 allow air to flow from the air reservoir 14 into the pump chambers 16 but not in the opposite direction. The valves 21 permit flow from the auxiliary air space 20 to the chambers 18, and the valves 17 permit a flow from each pump chamber 16 into its air chamber 18. In both cases the valves prevent any flow in the opposite direction.

Figure 3:
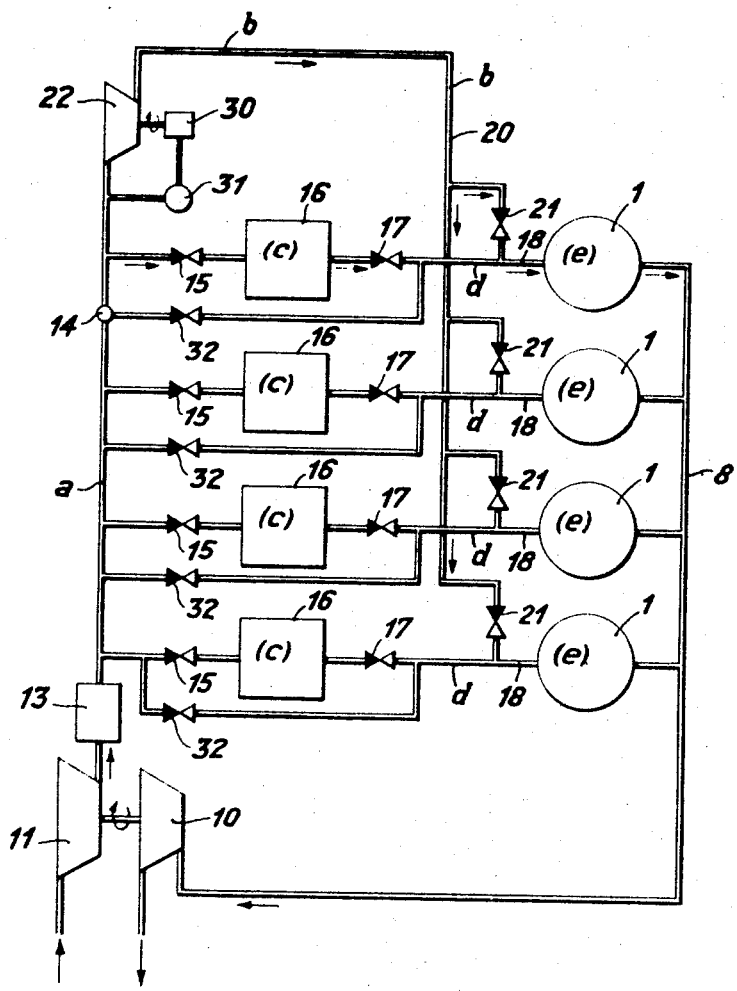
FIG. 3 is a circuit diagram of a four-cylinder internal combustion piston engine embodying the invention.

The circuit diagram in FIG. 3 illustrates embodiment of the invention into a multi-cylinder engine. Like parts have the same reference numerals as in FIG. 1. Each cylinder 1 is provided with a pump chamber 16. These chambers are connected by the non-return valve means 15 to the common air reservoir 14. Air flows from the pump chambers 16 through the non-return valve means 17 into the cylinders 1 as required. The blower 22 is connected in parallel to the pump chambers 16 and pumps air from the common air reservoir 14 to the common auxiliary air space 20 and thence through non-return valve means 21 into the individual air chambers 18, from which it goes into the associated cylinders 1. The blower is operated by an electric motor 30, which preferably runs at a substantially constant speed, regardless of the speed of the internal combustion engine. The exhaust gases pass from the cylinders to the exhaust reservoir 8 and thence to the exhaust-driven turbine 10. The supercharger blower 11 connected to the turbine then forces air from the atmosphere through the radiator 13 into the air reservoir 14.

Figure 2:
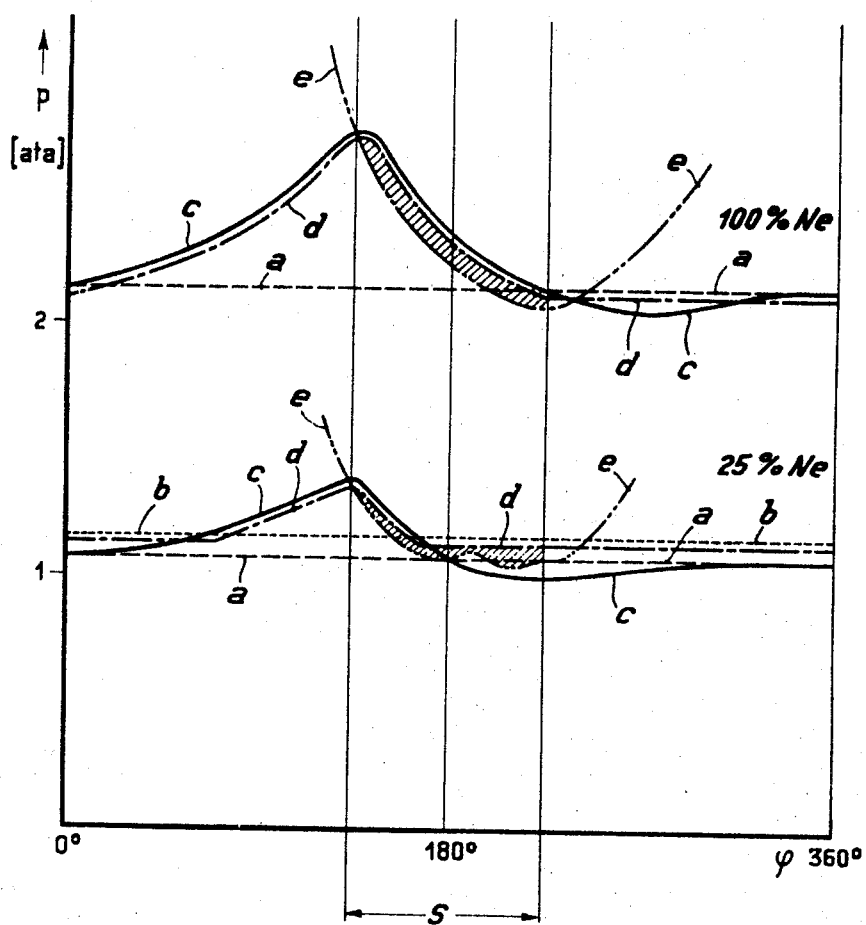
FIG. 2 is a diagram of the pressure distribution in the various portions of the engine during one revolution of the engine crankshaft and at various loads.

The pressure variations in the air reservoir 14, auxiliary air space 20, pump chamber 16, air chamber 18 and cylinder 1 are shown in FIG. 2. FIG. 2 is applicable to the cylinder of a one-cylinder engine and to the individual cylinders of a multi-cylinder engine. In this figure, the various pressure distribution curves are designated by the letters *a* to *e*. The same letters have been applied in FIGS. 1 and 3 to the spaces to which the associated curves relate. The curves are given for two engine power output ranges: full load (i.e. 100% load) and a partial load amounting to 25% of full load. Pressures in atmospheres absolute are plotted vertically against crankshaft angle horizontally, top dead center being identified with 0° and 360°.

Curve *a* represents the pressure in the air reservoir 14. The average pressure of the exhaust gases in the exhaust reservoir 8, which has been omitted from FIG. 2 for simplicity's sake, is slightly below curve *a* in both cases, i.e. for both values of load. The curve *b* running above curve *a* in the partial load case (lower set of curves) represents the substantially constant pressure in the auxiliary air space 20, which is increased above pressure *a* by means of the blower 22. There is no corresponding curve *b* in the full load rang, since the blower 22 is not employed when the engine is operated at full load.

The curve *c* represents the pressure distribution in the pump chamber 16. When the piston 2 moves downwards, the air in this chamber is compressed and some of it is expelled into the air chamber 18 (curve *d*). When the scavenging ports 5 open, which time is represented in FIG. 2 by the vertical line at the left-hand end of the range S, the pressure in chambers 16 and 18 (curves *c* and *d*) drops rapidly, since there is a continuous air flow path by way of the cylinder 1 between the air chamber 18 and the exhaust reservoir 8. If the scavenging system of the internal combustion engine has been correctly designed, i.e. in the present case if the volumes of chambers 16 and 18 have been correctly selected relative to the cross-section of the scavenging ports, the pressure represented by curve *c* drops in such fashion that at full load the curve *c* intercepts curve *a* at the instant at which the scavenging ports are closed by the piston (the vertical line at the right-hand end of range S in FIG. 2). The pressure rise caused by the scavenging pump (underside of piston 2) has therefore been exhausted at this instant, leaving only the normal pressure (curve *a*) prevailing in the air reservoir 14 which is delivered thereto by the supercharger blower. As the piston continues to rise, the pressure in the pump chamber 16 (curve *c*) drops below the pressure in the air reservoir 14 (curve *a*) on account of the resistance to air flow, as in the valves 15.

In contrast in the case of the partial load assumed, the pressure in the pump chamber 16 (curve *c*) drops below the pressure in the air reservoir 14 in the vicinity of the bottom dead center. Since the flow resistances in the non-return valves 15, 17 cause a further pressure drop, the flow now occurring from the air reservoir 14 would, without the effect of blower 22 and chamber 20, lower the pressure in chamber *d* approximately to the level of the pressure in the exhaust reservoir 8. This means that for approximately half the open time of the scavenging ports no air would flow through the cylinder. In the system embodying the invention however, the pressure in the air chambers 18 (curve *d*) is prevented from dropping below the pressure *b* in the auxiliary air space 20, except for a slight pressure drop caused by pressure reduction in the non-return valve means 21. This is because additional air flows from the auxiliary air space 20 into the air chamber 18. The pressure in the air chamber 18 can therefore drop only very slightly below the value indicated by curve *b*, even if the pressure in the pump chamber 16 drops as indicated by curve *c*. In both cases, i.e. for both full and partial load, the resistance of the non-return valve means 17 is allowed for in the diagram, since the part of curve *d* above the curve *a* or *b* is shown as slightly below the curve *c*. See the left-hand portion of FIG. 2.

The diagram also shows a curve *e* representing the variation with time of pressure in the cylinder 1. The hatched areas between the curves *d* and *e* give an indication of the intensity of scavenging of the cylinder, since they represent the course of the pressure drop from chamber 18 into the cylinder during the open period of the scavenging ports. It will be noted that without the invention scavenging would end at bottom dead center at a 25% partial load, i.e. approximately where curves *c* and *e* intersect, since in the absence of the invention the pressure *d* would fall to or below the pressure *e*. The hatched area above and to the right of this point of intersection, which represents a considerable improvement in the scavenging, is due to the auxiliary blower 22.

Thus, thanks to the use in accordance with the invention of a small auxiliary blower 22, which at for example a 25% partial load need not have a pressure difference between its input and output in excess of 0.15 atmosphere gauge, the internal combustion engine operates satisfactorily even under partial load. At loads above a certain partial load, the blower 22 is unnecessary and can be switched off. It can be controlled by providing in the air reservoir 14 a pressure measuring element which switches the drive motor for the blower 22 on or off according to the air pressure in the reservoir 14. A system of this kind is shown in FIG. 3: the motor 30 for the auxiliary blower 22 is operated by a control signal from a pressure measuring element 31.

To reduce the flow losses during scavenging, non-return valve means 32 may be provided to allow a direct flow from the air reservoir 14 into the individual air chambers 18. At higher loads, after the pressure peak in the communicating chambers 16 and 18 has decayed, these non-return valve means permit air to flow directly from the reservoir 14 into the appropriate chamber 18. The air thus passing from the reservoir into a chamber 18 and so into its cylinder 1 need not flow through the non-return means 15 and 17, where it would suffer a pressure loss.

The auxiliary blower 22 provided in accordance with the invention can also be used for other purposes. For example, if the turbo supercharger unit 10, 11 breaks down, the auxiliary blower 22 can be used to operate the engine. In this case the scavenging pumps 16 are connected in aparallel to the blower 22. Where there are a plurality of turbo supercharger units and one of these breaks down, some cylinders of the engine can be operated at full capacity with the remaining turbo supercharger unit or units, and the rest only with the scavenging pumps and auxiliary blower 22. In this case, however, there must be a partition at an appropriate place in the air reservoir 14.

The expression "free-running turbo charger" has been used herein to denote a supercharger not mechanically coupled with the engine which it feeds and hence not restricted to rotate at a speed proportional to that of the engine.

We claim:

1. A two-stroke cycle piston-type internal combustion engine comprising a cylinder, a piston in the cylinder, a supercharger, an air reservoir coupled to the output of the supercharger, a piston pump, an air chamber connected via scavenging ports to the cylinder, separate one-way valve means connected between the air reservoir and the piston pump and between the piston pump and the air chamber, and a supplementary air pumping means connected between the reservoir and chamber, said pump producing a peak pressure between 1.1 and 1.3 times the absolute pressure in the air reservoir.

2. An engine according to claim 1 in which the supplementary air pumping means produces in the air chamber a pressure higher than that in the air reservoir but lower than said peak pressure, said engine further comprising one-way valve means between the supplementary air pumping means and chamber.

3. An engine according to claim 2 wherein said supplementary air pumping means produces in the chamber an air pressure higher than that in the air reservoir by not more than 0.15 atmosphere.

4. An engine according to claim 1 wherein said supplementary air pumping means comprise an electrically driven centrifugal blower.

5. An engine according to claim 1 including a plurality of cylinders each having a separate piston pump and air chamber, said engine further comprising an auxiliary air space common to all cylinders connected between the outlet of the supplementary air pumping means and the air chambers of said cylinders, and separate one-way valve means between said auxiliary air space and each of said chambers.

6. An engine according to claim 1 including means responsive to air pressure in the reservoir for controlling the supplementary air pumping means.

7. An engine according to claim 1 including a crosshead coupled to the piston, and means closing the underside of said piston to form said pump.

8. An engine according to claim 1 including one-way valve means between the air reservoir and chamber.

9. An engine according to claim 5 wherein said supercharger is exhaust driven, said engine having an exhaust chamber connected between all of said cylinders and said supercharger.

References Cited

UNITED STATES PATENTS

| 1,955,620 | 4/1934 | Buchi | 60—13 |
| 2,924,069 | 2/1960 | Buchi | 123—65 |

CARLTON R. CROYLE, *Primary Examiner.*

DOUGLAS HART, *Assistant Examiner.*

U.S. Cl. X.R.

123—65